July 28, 1959
J. G. INGRES
2,896,585
BOOSTER MECHANISM
Filed June 15, 1955
3 Sheets-Sheet 3
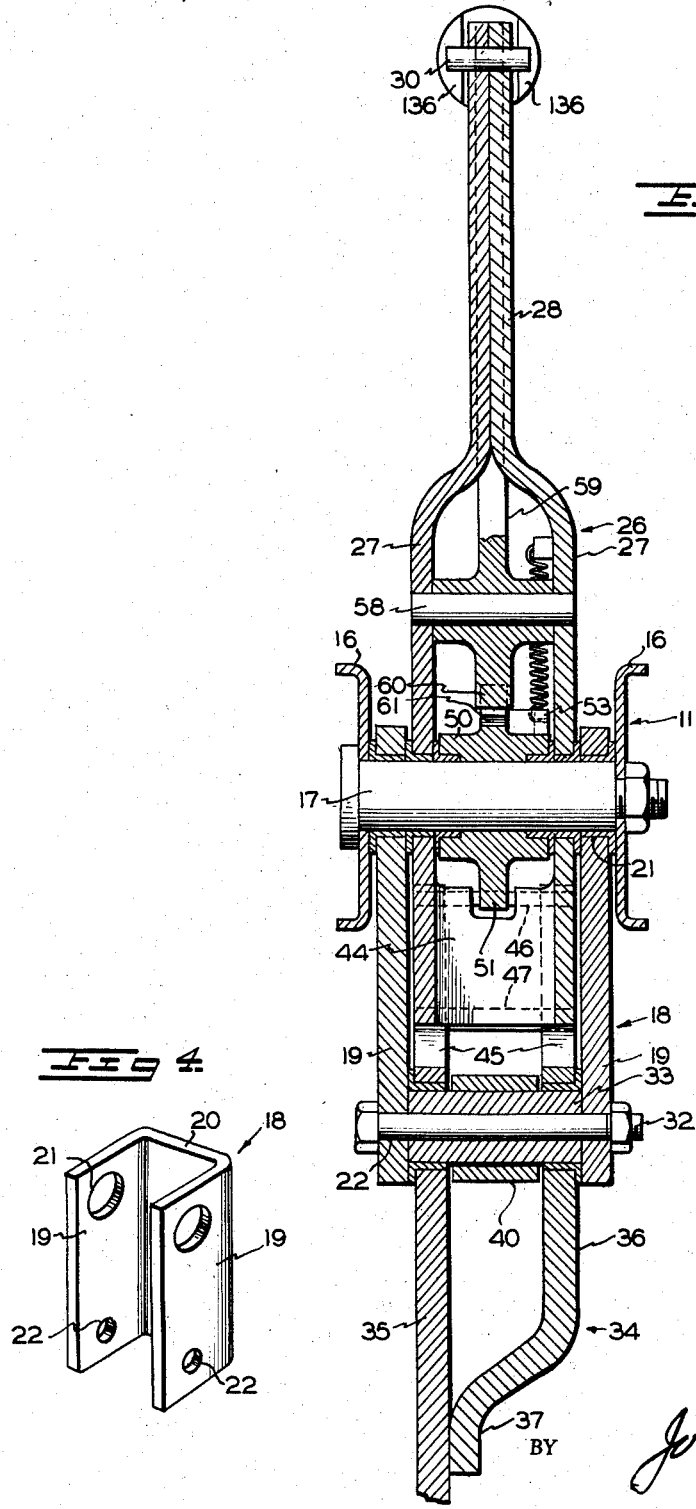
INVENTOR
JEANNOT G. INGRES
BY
ATTORNEY United States Patent Office 2,896,585
Patented July 28, 1959

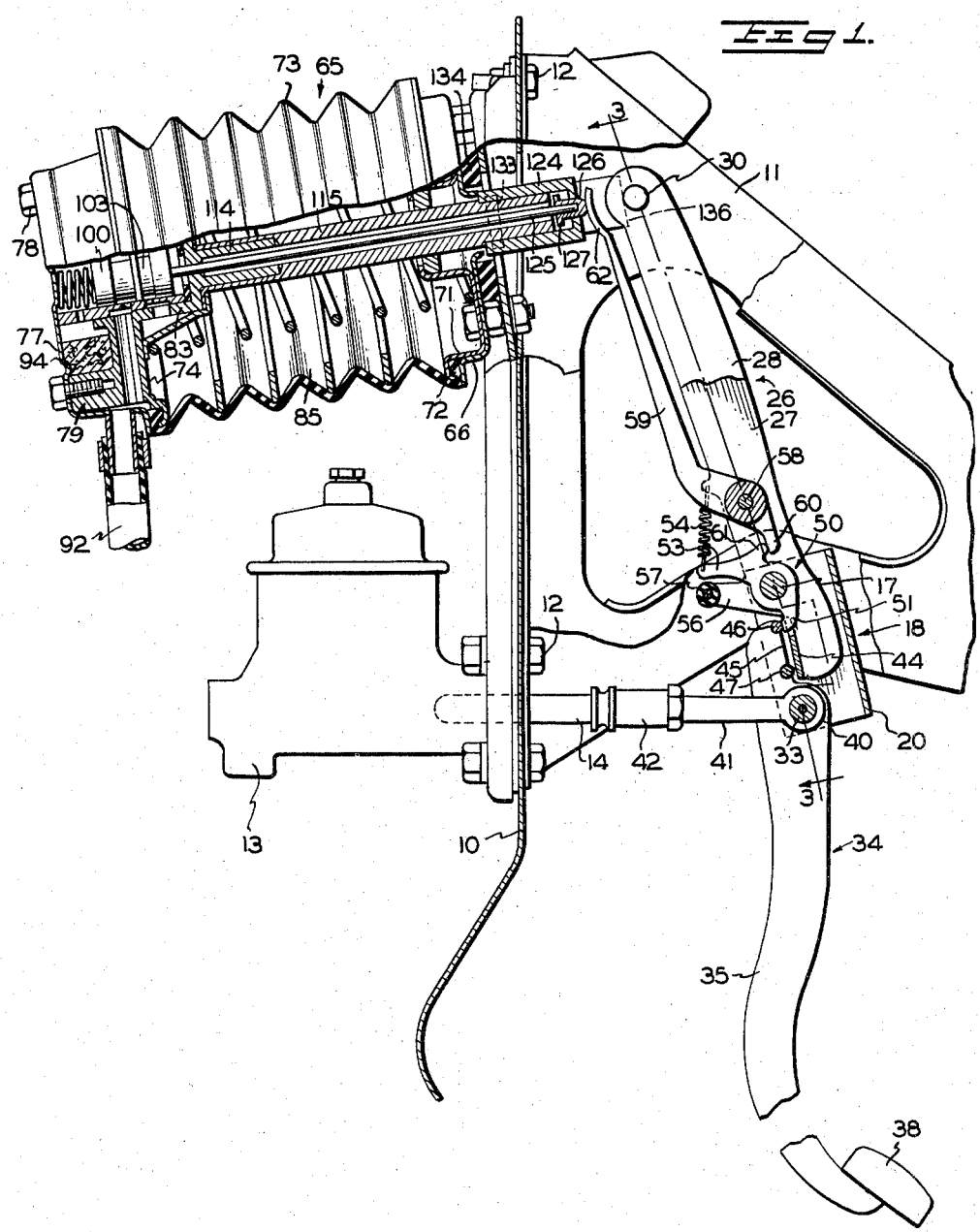

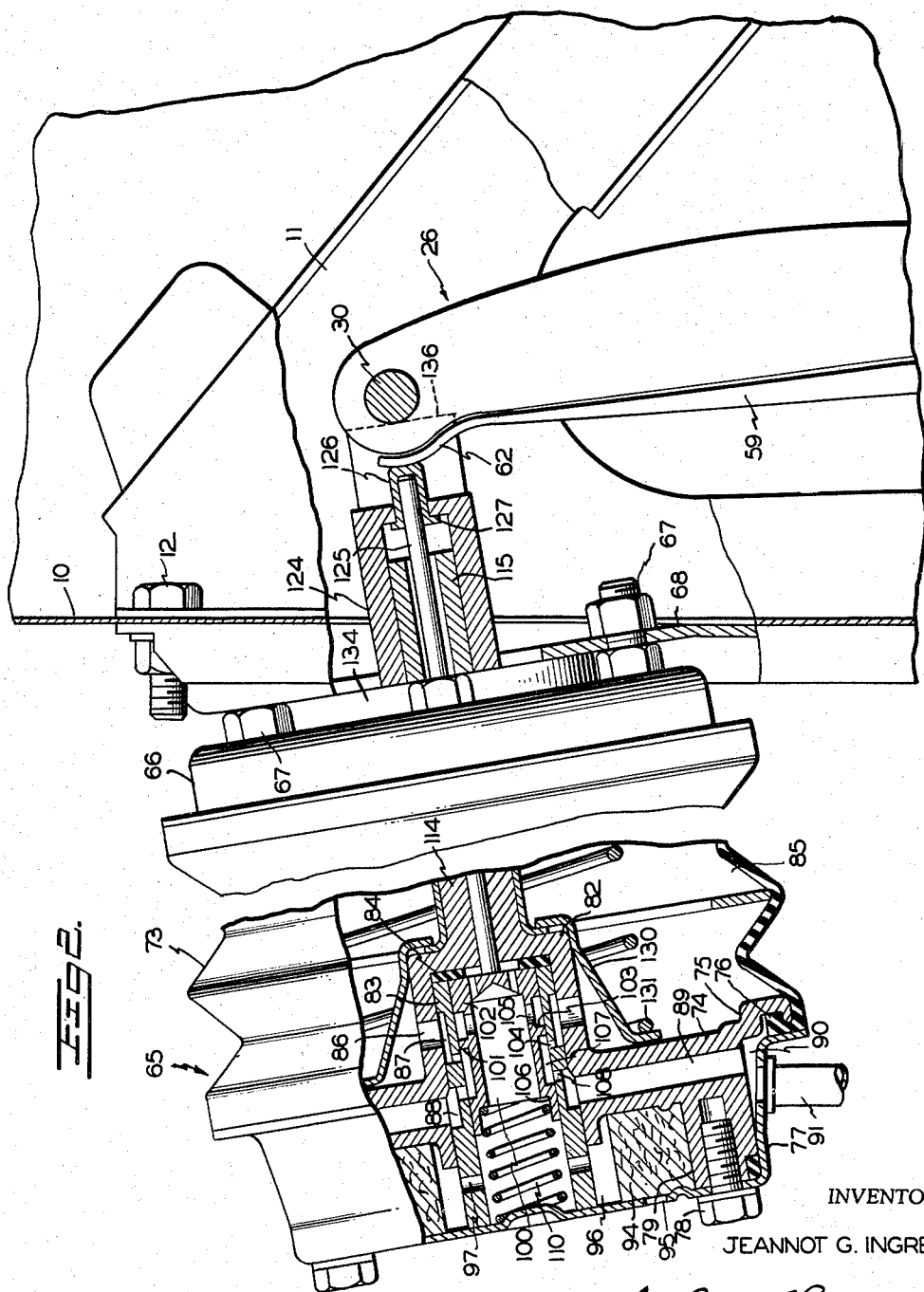

2,896,585

BOOSTER MECHANISM

Jeannot G. Ingres, Dearborn, Mich., assignor to Kelsey-Hayes Company, a corporation of Delaware Application June 15, 1955, Serial No. 515,636

13 Claims. (Cl. 121—41)

This invention relates to a booster mechanism and is an improvement over the structure disclosed and claimed in the copending application of David T. Ayers, Jr., Serial No. 439,674, filed June 28, 1954, now Patent No. 2,805,550.

In the copending application referred to, there is disclosed a novel type of booster brake mechanism for motor vehicles wherein the operating and controlling of the mechanism takes place through the medium of a depending or hanging brake pedal. The construction is highly advantageous for several reasons. For example, in previous types of booster brake mechanisms operated by depending pedals, it has been proposed to connect the booster motor to the pedal, and this has been regularly done by connecting the motor to the pedal below the level of the master cylinder. Very often, it is difficult, if not impossible, to find the space necessary to accommodate the booster motor in such an installation, and this problem is solved in the structure of the copending application referred to above.

In the copending application, the motor is arranged above the level of the master cylinder and its power is delivered to the lever mechanism by a pushing rather than a pulling action. This arrangement is not only advantageous in that it permits the mounting of the motor in a location where more space is available, but also is found highly advantageous in that the foot pedal is operable without any movement of the pressure responsive unit of the booster motor. Therefore, upon a failure of power in the booster motor, all of the force which can be generated by the operator's foot is delivered to the master cylinder for effecting a manual braking operation without expending a substantial part of this force against the compression of the return spring of the booster motor. In the copending application, however, the power lever associated with the motor moves in the event of a power failure, and it is therefore connected to the piston rod of the motor by a pin and slot arrangement, the piston rod therefore extending a substantial distance rearwardly of the vehicle fire wall.

An important object of the present invention is to provide a novel booster brake mechanism which is an improvement over the structure of the copending application referred to in that the rearwardly extending motor piston rod is eliminated by a novel construction of parts wherein the power lever remains stationary in its normal position when the foot pedal is operated and no power is available in the motor.

A further object is to provide such a mechanism wherein a purely abutting relationship is provided between the motor piston rod and the power lever associated with the brake pedal, and to so construct and arrange the parts relative to each other that the motor piston rod and power lever remain stationary, together with all motor parts when a failure of power for the motor occurs.

A further object is to provide a mechanism of the character referred to wherein a more advantageous lever ratio is provided for the manual application of the brakes in the event of a failure of power in the booster motor.

Other objects and advantages of the invention will become apparent during the course of the following description.

In the drawings I have shown one embodiment of the invention. In this showing:

Figure 1 is a side elevation of the apparatus, parts being broken away and parts being shown in section, all of the elements of the apparatus being illustrated in their normal off positions;

Figure 2 is an enlarged fragmentary sectional view of the upper portion of the apparatus, parts being broken away and parts being shown in section;

Figure 3 is a detail sectional view through the lever mechanism taken substantially on line 3—3 of Figure 1; and Figure 4 is a detail perspective view of a rocker forming a part of the lever mechanism for the apparatus.

Referring to Figure 1, the numeral 10 designates the conventional fire wall of the motor vehicle rearwardly of which is secured a generally triangular bracket 11 secured to the first wall by bolts 12 certain of which are also employed for securing to the fire wall forwardly thereof a conventional master cylinder 13. This master cylinder has therein the usual fluid displacing piston (not shown) operable by a push rod 14, as will be understood.

The bracket 11 has opposite wall portions 16 (Figure 3) between which is connected a relatively heavy pivot pin 17. This pin supports a rocker 18 of U-shaped cross section, as shown in Figure 4, with opposite walls 19 lying adjacent the side wall members 16 of the bracket 11. The walls 19 of the rocker 18 are connected by a base wall 20 to complete the U-shaped cross sectional shape of the rocker 18. The walls 19 are provided with relatively large alined openings 21 for the extension therethrough of the pivot pin 17. Adjacent their lower ends the walls 19 are provided with smaller alined openings 22 for a purpose to be described.

Since the pivot pin 17 is carried by the bracket 11, it will be apparent that this pin is stationary, and the rocker 18 rocks about the axis of the pin 17 under conditions to be described. The pin 17 also supports for rocking action a power lever indicated as a whole by the numeral 26. This lever is formed of opposite arms 27 the lower portions of which lie in proximity to the walls 19 of the rocker 18, the upper ends 28 of the members 27 lying in contact with each other and being secured together in any suitable manner, for example by welding. A force transmitting pin 30 is carried by the upper ends of the lever arms 28 for a purpose to be described.

The openings 22 in the rocker 18 receive a cross pin in the form of a bolt 32 supporting a bearing sleeve 33 between the side walls 19 and acting as spacers for such arms. The bearing 33 pivotally supports a foot pedal indicated as a whole by the numeral 34 and comprising a main lever member 35 and an auxiliary lever member 36. These members are spaced at their upper ends and such upper ends lie adjacent the side walls 19. The lower end 37 of the lever member 36 extends into engagement with the lever member 35 (Figure 3) and is secured thereto in any suitable manner. The pedal lever member 35 carries at its lower end a conventional pedal pad 38 (Figure 1).

The bearing 33 supports for rocking movement a collar 40 mounted on a rod section 41 connected as at 42 to the push rod 14 and forming in effect a part thereof. It will be obvious that movement of the bearing 33 to the left in Figure 1 effects operation of the master cylinder 13 to apply the brakes.

The lower end of the power lever 26 has the members 27 thereof connected by a transverse web 44. Forwardly of this web, the upper ends of the pedal lever members 35 and 36 are cut back to form upper lever edges 45 (Figure 1) spaced from the web 44. The lever edges 45 are connected by upper and lower rods 46 and 47 welded thereto and projecting rearwardly thereof. The rods 46 and 47 are engageable with the web 44 under conditions to be described but are normally spaced therefrom, the rod 46 preferably being spaced from the web 44 a slightly greater distance than the rod 47.

A trigger member 50 is mounted to rock on the pin 17. This trigger member has a depending finger 51 normally engaging the rod 46, the finger 51 extending slightly forwardly of the web 44 as shown in Figure 1. It will be apparent that when the pedal pad 38 is depressed, therefore, the rod 46 will engage the finger 51 and swing the trigger 50 in a counterclockwise direction. The trigger 50 has a forwardly extending arm 53 connected by a spring 54 to one of the power lever members 27, this spring urging the trigger 50 to turn in a clockwise direction to its normal position shown in Figure 1.

One of the power lever members 27 is provided with an arm 56 carrying at its free end a rubber bumper 57 normally spaced slightly below and engageable by the arm 53 when the latter is operated by the pedal lever as further described below.

Above the supporting pin 17 the arms 27 of the power lever 26 carry a pin 58 pivotally supporting a valve control lever 59 for the booster motor described below. The lever 59 carries a depending finger 60 normally engaging a finger 61 carried by the trigger 50. The upper extremity of the lever 59 lies forwardly of the pin 30 and is slightly curved as at 62.

The booster motor is indicated as a whole by the numeral 65. This motor comprises a stationary, preferably stamped head 66 secured by bolts 67 to a bracket 68 fixed to the fire wall. The upper and lower ends of this bracket are secured in position by the bolts 12. A retaining ring 71 (Figure 1) is fixed to the head 66 by the bolts 67 and fixes with respect to the head 66 a bead 72 at the end of a bellows 73 forming the body of the motor.

The other end of the bellows 73 is fixed with respect to a movable head 74 which is preferably die cast and includes a peripheral flange 75 against which seats a bead 76 carried by the adjacent end of the bellows 73. This bead is retained in position by a sheet metal cap 77 secured to the head 74 by screws 78 threaded in bosses 79 integral with the head 74. The head 74 forms the pressure responsive element of the motor, as will become apparent.

The head 74 is provided with an integral axial extension 82 forming a valve housing in which is arranged a valve sleeve 83 engaging at one end against a resilient washer 84 and having its other end engaged and retained in position by the cap 77. The space between the two motor heads 66 and 74 forms a variable pressure chamber 85, and the valve housing 82 is provided with radial ports 86 communicating between the chamber 85 and an annular groove 87 formed around the valve sleeve 83. The valve sleeve 83 is provided with a second annular groove 88. This groove communicates through radial passages 89, formed in the head 74, with an annular space 90 formed between the head 74 and cap 77. The space 90 communicates through a nipple 91 with one end of a line 92 (Figure 1) the other end of which is connected to a suitable source of vacuum such as the intake manifold of the motor vehicle engine.

The central portion of the cap 77 is spaced from the body of the head 74 to receive an annular air cleaner 94. The adjacent portion of the cap is provided with atmospheric openings 95 (Figure 2) to admit air to the air cleaner 94, and the clean air flows into an annular space 96 surrounding the adjacent end of the valve sleeve 83. This sleeve is provided with radial ports 97 for the admission of air into the interior of the sleeve.

A spool valve 100 is slidable in the sleeve 83. This valve is provided with a pair of lands 101 and 102 forming therebetween an annular groove 103 normally communicating with the annular groove 87 through ports 104. The valve 100 is provided with ports 105 communicating between the groove 103 and the interior of the valve, which obviously is open to the atmosphere at all times through ports 97. Spaced from the land 101, the valve is provided with a third land 106 forming with the land 101 an annular groove 107 movable in the operative positions of the parts into communication with the ports 104 (Figure 2) and normally disconnected from such ports as in Figure 1. The groove 107 at all times communicates with the vacuum space 88 through ports 108 formed in the valve sleeve 83. A spring 110 biases the valve 100 to the operative position shown in Figure 2, the spring 54 (Figure 1) normally overbiasing the spring 110, as will be apparent below, to retain the valve 100 in its off position shown in Figure 1.

The valve housing 82 is provided with an integral axial projection 114 received in an axial recess in a tubular piston rod 115 projecting through the head 66. Referring to Figure 1, it will be noted that the retaining cup 71 is provided with a cylindrical inner portion in which is arranged suitable bearing and sealing means for the rod 115, as will become apparent.

The rod 115 has its outer end arranged in a cap member 124 forming in effect a part of the piston rod of the motor. Through the extension 114 and rod 115 projects a valve control rod 125 the left-hand end of which (Figure 2) engages the valve 100. The right-hand end of the rod 125 carries a nylon or similar cap 126 shouldered as at 127 to limit its movement outwardly of the member 124. It will be apparent that the spring 110 biases the valve 100 to the motor energizing position shown in Figure 2, in which case the valve and its control rod 125 and the cap 126 will occupy the positions shown in Figure 2.

Within the bellows 73 is arranged a spring seat 130. This seat is engaged by one end of a relatively heavy return spring 131, the other end of which engages the retaining cup 71. This spring maintains the movable motor head 74 in its extended position and such movement is limited in any suitable manner, for example as shown in the copending application referred to. Such means, for example, may be in the form of bosses 133 carried by the cap 124 and engaging a rubber bumper 134.

Instead of extending the member 124 rearwardly and slotting it for the pin 30 or a similar pin, the cap 124 is provided with spaced rearwardly extending lugs 136 which merely have an abutting relationship with the pin 30 to push the upper end of the power lever 26 when the motor is energized. This occurs when the lever 59 has its upper end swung to the right as viewed in Figure 1 to release the cap 126.

Operation

The parts normally occupy the positions shown in Figure 1. Under such conditions the valve groove 103 communicates with ports 104 and thus with the motor chamber 85. The valve groove 103 communicates through ports 105 with the atmosphere, as will be apparent. The land 101 will be to the left of the ports 104 and, accordingly, the vacuum ports 108 will communicate only with the valve groove 107. Atmospheric pressure thus will be present in the motor chamber 85 to balance pressures on opposite sides of the movable motor head 74.

The spring 54 overbalances the spring 110 when the parts are released, the spring 54 thus maintaining the lever 59 in its normal motor re-energizing position. The pedal 34 and power lever 26 will be maintained in position by the usual master cylinder return spring, the pin 30 remaining in engagement with the abutment ears 136.

To operate the brake, the pedal pad 38 is depressed and the pedal lever 34 will first rock on the axis of the bearing 33 while this bearing remains stationary. The cross rod 46, engaging the finger 51, will rock the trigger 50 counterclockwise to relieve pressure of the finger 61 against the lever finger 60, this action taking place against the tension of the spring 54 which, while not particularly strong, overbalances the valve spring 110, as stated above.

When the finger 61 relieves its pressure against the lever finger 60, no tension of the spring 54 will be transmitted to the lever 59 and, accordingly, the valve spring 110 is free to exert its force to move the valve 100 to the right as viewed in Figures 1 and 2. This movement is transmitted through rod 125 to the valve operating lever 59 to move the latter as far as permitted in accordance with the position of the finger 61. This finger therefore controls swinging movement of the lever 59 and causes the motor to partake of a follow-up movement with respect to pedal operation.

When the valve 100 moves to the right in Figure 2, communication between valve groove 103 and ports 104 is cut off and communication is open between ports 104 and 108 through groove 107. The ports 108 being always in communication with the source of vacuum, air will be exhausted from the motor chamber 85 through ports 86, valve groove 87, etc. Atmospheric pressure will now move the motor head 74 toward the right. The abutments 136, bearing against the pin 30, will effect movement of the upper end of the power lever 26. This lever will turn about its fixed pivot pin 17 and the web 44 will move the slight distance necessary to engage the rod 47. Thereafter, the combined forces of the operator's foot, applied through the pedal 38, and the power developed by the motor, applied to the lever 34 through the rod 47, will effect operation of the master cylinder to apply the brakes.

The foregoing operation, prior to the point of maximum energization of the motor 65, takes place with the web 44 in solid engagement with the rod 47 but with the web 44 slightly spaced from the rod 46 so that this rod, operating against the finger 51, may accurately control energization of the motor. As maximum motor energization is reached, the rod 46 will move into solid engagement with the web 44, and thereafter, the pedal lever 34, power lever 26 and rocker 18 will turn as a unit to effect brake application up to the maximum point.

Assuming that a brake application is made when no power is available for the motor, the rocking of the trigger 50 will release the valve 100 for movement by the spring 110, but of course motor energization will not take place and the movable motor head 74 will remain in its normal position. Rocking movement of the pedal lever 34 will take place until the rod 46 engages solidly against the web 44. This point of engagement being below the pivot pin 17, forces applied by the rod 46 to the web 44 of the power lever will tend to move the upper end of this lever toward the left, which movement cannot take place. The effective fulcrum of the pedal lever 34 thereupon becomes the rod 46, the collar 40 moving to the left as viewed in Figure 1, together with the rocker 18 which is free to turn about the pin 17.

It will be noted that during the normal operation of the mechanism, reaction will be provided through the foot pedal to supply the latter with accurate "feel," and the reaction ratio against the pedal pad will be the distance from the pedal pad to the axis of the bearing 33, compared with the distance between the axis of the bearing 33 and the rod 47. This roughly is a 12:1 ratio, and the parts may be designed to provide any desired ratio. When no power is available the lever ratio changes and is determined by the distance from the pedal pad to the axis of the bearing 33 compared with the distance from such axis to the rod 46. This is roughly a 6:1 ratio, and operation of the pedal under such conditions displaces less fluid from the master cylinder for the same pedal movement, but the leverage will be increased. This leverage increase permits the operator to develop a higher master cylinder pressure to render a solely manual brake application more effective.

From the foregoing, it will be apparent that the present construction provides the advantages of the structure of the copending application referred to above, while eliminating movement of the power lever when no power is available for the booster motor. The construction also eliminates the rearwardly extended slotted end of the motor piston rod and provides for an increased lever ratio for the manual operation of the brakes in the event of a power failure.

It is to be understood that the form of the invention shown is to be taken as a preferred example of the same and that various changes may be made in the construction as do not depart from the scope of the appended claims.

I claim:

1. A booster mechanism comprising a member to be operated, a power lever, a fixed pivot supporting said power lever, a motor having a power operable unit engaging said power lever to operate the latter upon energization of said motor, a control mechanism connected between a power source and said motor and operable to control said motor, a pivoted control lever engaging said control mechanism and biased to a normal off poistion to move said control mechanism to a position disconnecting said motor from said source, means biasing said control mechanism to an operative position whereby it moves to such position when released by movement of said control lever from a normal off position to connect said motor to said source, a pedal lever pivotally supported by said power lever for movement independently of said control lever and connected to said member to be operated and to said power lever, and a trigger pivoted with respect to said power lever and engaging said pedal lever and said control lever to release the latter for movement from its normal off position upon movement of said pedal lever from its normal position.

2. A booster mechanism according to claim 1 wherein said trigger is pivoted for turning movement about said fixed pivot, said control lever being pivoted to said power lever and having a finger engageable with said trigger.

3. A booster mechanism according to claim 1 wherein said trigger is pivoted for turning movement about said fixed pivot, said control lever being pivoted to said power lever and having a finger engageable with said trigger, said trigger being operable by said pedal lever for movement between a normal position and a fully operative position in which said motor is fully energized, and a cushion abutment arranged in the path of travel of and engaged by a portion of said trigger when the latter is in its fully operative position.

4. A booster mechanism comprising a member to be operated, a fixed pivot pin, a power lever mounted for turning movement on said pivot pin, a motor having a power operable unit engaging said power lever, a control mechanism connected between a power source and said motor and operable to control said motor and biased to an operative position connecting said motor to said source, a rocker mounted to turn on said fixed pivot pin and connected to said member to be operated, a pedal lever pivotally supported by said rocker and engaging said power lever, a pivoted control lever engaging said control mechanism and biased to a normal position disconnecting said motor from said source, and a pivoted trigger connected between said pedal lever and said control lever for operating the latter against its biasing spring, when said pedal lever is moved from a normal off position, to release said control mechanism for movement to said operative position.

5. A booster mechanism according to claim 4 provided with lost motion between said pedal lever and said power lever whereby, upon a failure of power for said motor, said lost motion is taken up and said power lever, said rocker and said pedal lever are adapted to rock as a unit to move said member to be operated.

6. A booster mechanism according to claim 4 wherein said control lever is pivoted to said power lever at a point spaced from said fixed pivot pin, said trigger being pivoted on said fixed pivot pin and having portions on opposite sides of the axis of such pin engageable respectively with said pedal lever and said control lever.

7. A booster mechanism according to claim 4 provided with lost motion between said pedal lever and said power lever whereby, upon a failure of power for said motor, said lost motion is taken up, and said power lever, said rocker and said pedal lever are adapted to rock as a unit to move said member to be operated, said trigger being operable by said pedal lever within the limits of said lost motion, and a cushion engaging a portion of said trigger slightly before said lost motion is completely taken up.

8. A booster mechanism according to claim 4 provided with lost motion between said pedal lever and said power lever whereby, upon a failure of power for said motor, said lost motion is taken up and said power lever, said rocker and said pedal lever are adapted to rock as a unit to move said member to be operated, said trigger being pivoted on said fixed pivot pin, said control lever being pivoted intermediate its ends to said power lever, said trigger on the opposite sides of the axis of said fixed pivot pin respectively engaging said pedal lever and said control lever.

9. A booster mechanism comprising a member to be operated, a fixed pivot pin offset laterally from said member, a rocker pivotally connected to said fixed pivot pin and having pivotal connection with said member, a power lever pivotally mounted on said fixed pivot pin, a motor having a power operable unit engaging said power lever to operate the latter, a control mechanism connected between a power source and said motor and operable to control said motor and having a normal position disconnecting said motor from said source, a first biasing means biasing said control mechanism to an operative position connecting said motor to said source, a pivoted control lever having an end engaging said control mechanism, a second biasing means stronger than said first biasing means and connected to transmit a force through said control lever to said control mechanism to tend to hold the latter in its normal position, a pedal lever pivoted to said rocker at the pivotal connection of the latter to said member to be operated, and means connected between said pedal lever and said control lever for moving the latter against said second biasing means to release said control mechanism for movement by said first biasing means upon movement of said pedal lever from its normal position.

10. A booster mechanism according to claim 9 wherein the means connected between said pedal lever and said control lever comprises a trigger pivotally supported by said fixed pivot pin and engaging said pedal lever and said control lever.

11. A booster mechanism according to claim 9 wherein the means connected between said pedal lever and said control lever comprises a trigger pivotally supported by said fixed pivot pin and engaging said pedal lever and said control lever, said second biasing means comprising a spring connected between said trigger and said power lever and biasing said trigger for turning movement in one direction to turn said control lever to a normal position holding said control mechanism in its normal position.

12. A booster mechanism according to claim 9 wherein said pedal lever has lost motion connection with said power lever between said fixed pivot pin and the pivotal connection of said rocker with said member to be operated.

13. A booster mechanism according to claim 9 wherein said pedal lever has lost motion connection with said power lever between said fixed pivot pin and the pivotal connection of said rocker with said member to be operated, said means connected between said pedal lever and said control lever comprising a trigger pivoted on said fixed pivot pin and having portions on opposite sides thereof engageable respectively with said control lever and said pedal lever, said trigger being operable within the limits of said lost motion connection to release said control mechanism for movement to said operative position.

References Cited in the file of this patent
UNITED STATES PATENTS

| | | |
|---|---|---|
| 2,107,110 | Eaton et al. | Feb. 1, 1938 |
| 2,207,700 | Porter | July 16, 1940 |